United States Patent [19]  [11] 4,189,807
Byerly  [45] Feb. 26, 1980

[54] CLAMP

[75] Inventor: Robert M. Byerly, Burbank, Calif.

[73] Assignee: Viking Industries, Inc., Chatsworth, Calif.

[21] Appl. No.: 888,313

[22] Filed: Mar. 20, 1978

Related U.S. Application Data

[63] Continuation of Ser. No. 741,938, Nov. 15, 1976, abandoned.

[51] Int. Cl.² .................. B65D 65/10; F16L 3/12
[52] U.S. Cl. ........................... 24/16 R; 248/74 B; 174/40 CC
[58] Field of Search .......... 24/262 R, 73 SA, 73 AP, 24/73 PB, 279, 16 R; 248/74 R, 74 A, 74 B, 74 PB, 68 R, 54 R; 174/40 CC; 277/208

[56] References Cited

U.S. PATENT DOCUMENTS

| | | | |
|---|---|---|---|
| 2,387,295 | 10/1945 | Robertson | 248/74 B |
| 2,415,517 | 2/1947 | Morehouse | 248/74 |
| 3,046,028 | 7/1962 | Nathan | 277/208 |
| 3,856,245 | 12/1974 | Byerly | 248/54 R |
| 3,995,795 | 12/1976 | Hogan | 248/68 R |

Primary Examiner—Kenneth Dorner
Attorney, Agent, or Firm—Ellsworth R. Roston

[57] ABSTRACT

A clamp includes a cushion and a strap each made from a resilient material. The cushion has a body portion and a pair of lip portions extending toward each other in spaced relationship to the body portion to define a pocket. The strap is disposed in the pocket and is bendable in a loop to retain a cable within the cushion.

A pair of projections extend from the body portion at the side opposite to the lip portions. The projections are shaped to retain cables of different cross-sectional area in the space between the projections when the strap is bent in the loop. The projections define resilient springs which bend outwardly from each other to accommodate cables of different cross-sectional area.

Each of the projections has a pyramidal shape and defines a shallower angle with the body portion at the inboard side than at the outboard side. The width of each projection is approximately equal to the height. A hole may be provided at the base of each projection to facilitate controlled bending of the projection and the damping of vibrations of the cable.

3 Claims, 6 Drawing Figures

CLAMP

This is a continuation of application Ser. No. 741,938 filed Nov. 15, 1976 now abandoned.

This invention relates to a clamp for retaining electrical cables or bundles of wires in fixed position. More particularly, the invention relates to a clamp for retaining in fixed position cables or bundles of wires having different cross-sectional areas. The invention is also concerned with clamps for damping the vibrations of cables held by the clamps in fixed position.

Electrical cables or bundles of wires often extend for considerable distances in electrical systems in which they are incorporated. When the cables or bundles of wires extend for considerable distances, they are often clamped at progressive positions along these distances in order to ensure that the cables or bundles of wires will have a fixed relationship with the electrical system. In this way, the cables or bundles of wires cannot interfere with the operation of the electrical system and cannot become damaged.

In the systems of the past, an individual clamp has had to be used to retain in fixed position each cable or bundle of wires having a different diameter. As a result, a considerable number of clamps of different sizes have had to be provided, and each clamp has had to be individually selected to match the cross-sectional area of the cable or bundle of wires being retained in fixed position. This has increased the expense of assembling the systems and has also resulted in errors resulting from a mismatch between the clamps and the cables or bundles of wires. Although the problem has existed for some time, no one has been able to provide a single clamp capable of retaining cables or bundles of wires of different cross-sectional area even though a considerable effort has been devoted to solve the problem.

This invention provides a clamp which is capable of being used to retain cables or bundles of wires having considerable variations in cross-sectional area. The invention includes a strap and further includes a cushion having resilient properties. The cushion has a body portion and a pair of lip portions extending toward each other in spaced relationship to the body portion to define a pocket. The strap is disposed in the pocket and is bendable in a loop to retain a cable. Retaining means such as a screw may extend through the opposite ends of the strap in the looped configuration of the strap, and a nut may be disposed on the screw to retain the strap in the looped configuration.

A pair of projections extend from the body portion at the side opposite to the lip portions. The projections extend into the loop when the strap is bent into the looped configuration. The projections are shaped to retain cables of different cross-sectional area in the space between the projections. The projections define resilient springs which bend outwardly from each other when a cable or bundle of wires is disposed within the loop. In this way, the projections are resiliently adaptable to accommodate cables or bundles of wires of different cross-sectional area. As the term "cables" is used hereafter, it will be understood to include "bundles of wires".

Each of the projections has a pyramidal shape and defines a shallower angle with the body portion at the inboard side than at the outboard side. The angle at the outboard side is variable within particular limits to control the bending characteristics of the resilient spring defined by the projections. The width of each projection is approximately equal to the height.

The clamp constituting this invention has certain important advantages. One advantage is that the clamp imposes a controlled pressure on the cable extending through the loop. Another advantage is that the clamp damps vibrations of the cable disposed in the loop. By damping vibrations, the clamp, and particularly the strap, may be lighter in weight than the clamps of the prior art. These advantages may be enhanced by providing a hole in the projections near the base of the pyramid defined by the projections.

Figure 1:
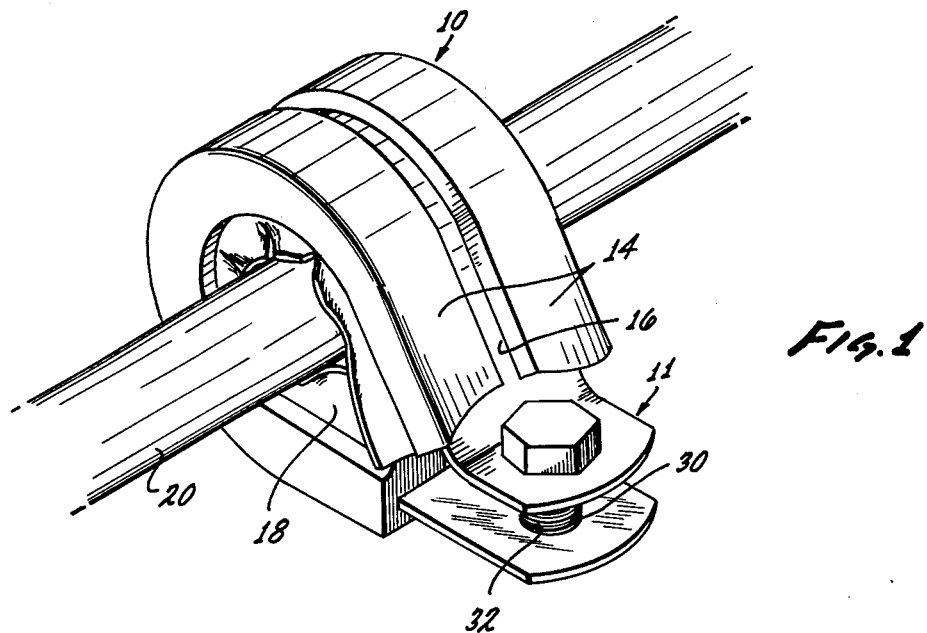
FIG. 1 is a perspective view of a clamp in a closed or operative relationship for retaining a cable in fixed position.
Figure 2:
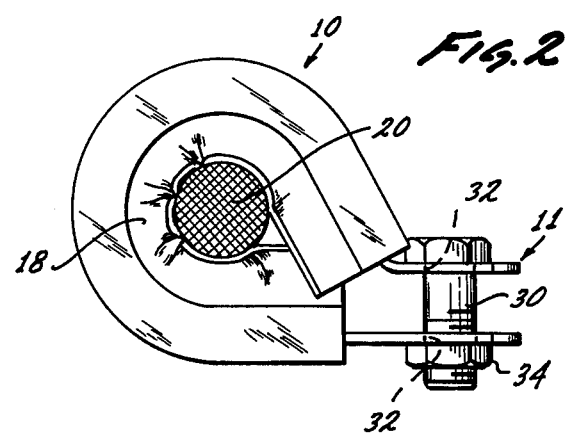
FIG. 2 is a front elevation view of the clamp in the closed or operative positions.
Figure 3:
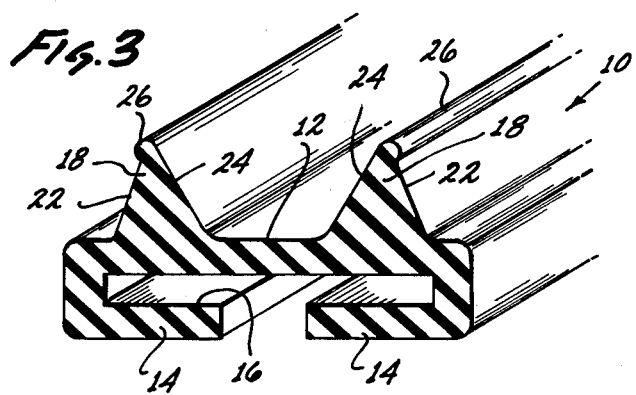
FIG. 3 is a sectional view of the clamp substantially on the line 3—3 of FIG. 2 when no cable is being retained by the clamp.

In the embodiment shown in the drawings, a cushion generally indicated at 10 and a strap generally indicated at 11 are provided. The strap 11 may be made from a suitable material such as steel and the cushion may be made from a suitable resilient material such as a silicone rubber.

The cushion is provided with a body portion 12 and a pair of lips 14. The lips 14 extend integrally from the body portion for a relatively short distance and are then bent inwardly to extend toward each other. In this way, the lip portions 14 define a pocket 16 for receiving the strap 11.

A pair of projections 18 extend outwardly from the body portion 12 at the side of the body portion opposite to the lip portions 14. Each of the projections 18 is shaped to define a resilient spring having properties of bending away from the other projection when a cable 20 is disposed on the projections 18 for retention in the space between the projections.

Each of the projections 18 has an outboard side 22 and an inboard side 24. The side 24 defines a shallower angle with the body portion 12 than the side 22 so as to ensure that the projections will be bent outwardly when the cable 20 is disposed in the space between the projections. Each of the projections 18 is disposed on the body portion 12 at an inward position from the ends of the body portion to provide a support for the projections when the projections are bent outwardly by the cable. In this way, the controlled bending of the projections 18 is facilitated.

Each of the projections 18 is shaped to define a pyramid. Each of the projections 18 has a height substantially equal to the width of the projections at the base of the pyramid defined by the projections. For example, the projections may have a height of 0.156" and the base of the projections may have a width of approximately 0.150". When the projections are provided with heights and widths approximately equal to each other, the controlled bending of each projection in a direction away from the other projection by the cable 20 is facilitated.

Each of the projections is provided with an ear 26 an its outer end. This ear defines a feathered edge which inhibits any tearing of the projections by the cables which are disposed against the projections. Such tearing might otherwise occur because of the abrasive qualities of the cable 20.

The side 24 of each projection preferably defines an angle such as approximately 60° with the surface of the body portion 12. The side 22 preferably defines an angle between approximately 70° and 80° with the surface of the body portion 12. This angle controls the stiffness of the spring defined by the projections. As the angle increases, the stiffness of the spring tends to increase.

In order to retain a cable firmly in position, the strap 11 is disposed in the pocket 16 to define the clamp. The clamp is then bent around the cable to be retained in fixed position so that the projections 18 are disposed against the cable. The ends of the strap are then retained in fixed position by passing a screw 30 through holes 32 in the strap and threading a nut 34 tightly on the screw 30.

Figure 4:
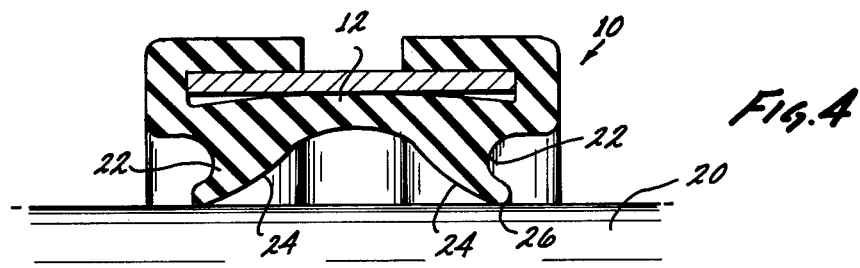
FIG. 4 is a sectional view similar to that shown in FIG. 3 but with a cable of a first cross-sectional area retained by the clamp.
Figure 5:
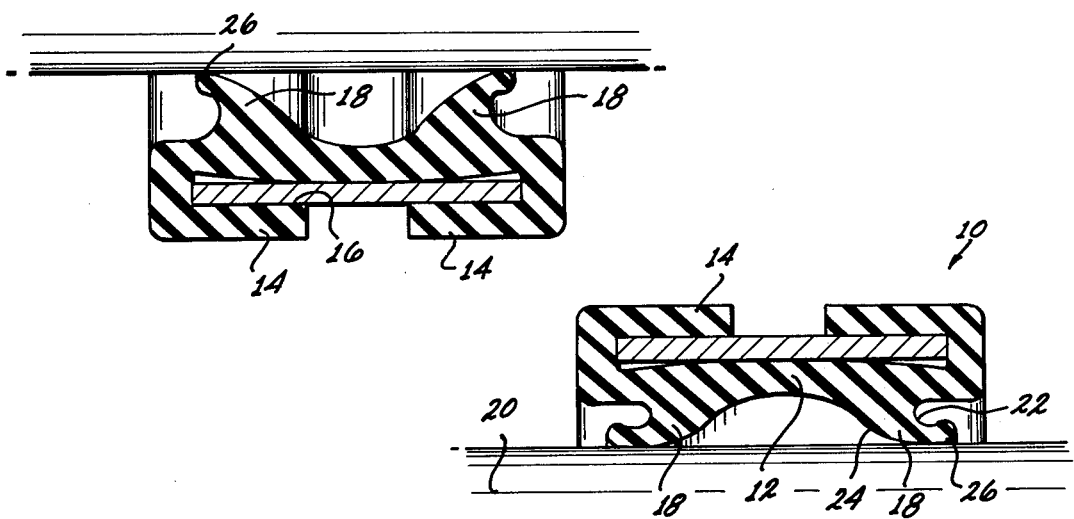
FIG. 5 is a sectional view similar to that shown in FIG. 4 but with a cable of a larger cross-sectional area than that shown in FIG. 4.

The clamp constituting this invention is adaptable to retain in fixed position cables of different cross-sectional area. This may be seen from FIG. 4 and 5. The projections 18 are bent outwardly by the cable in accordance with the differences in the cross-sectional areas of the cables to be retained. This bending occurs on a controlled basis because of the shape provided for the projections and particularly because of the differences in the angles of the sides 22 and 24 relative to the surface of the body portion 12. The controlled bending is also facilitated because of the relationship between the height and width of each projection. The shape of the projections also tends to damp vibrations of the cable because of the action of the projections as resilient springs. In this way, the thickness and weight of the straps 11 can be minimized.

In addition to the dimensions specified above, other dimensions of one embodiment of the invention may be provided. For example, the projections may be separated from each other at their bases by approximately 0.200" and each projection may be disposed inwardly from the ends of the body portions by approximately 0.09". The height of the pocket 16 may be approximately 0.06" and the thickness of each of the lip portions 14 may be approximately 0.06". The thickness of the body portion may be approximately 0.120".

Figure 6:
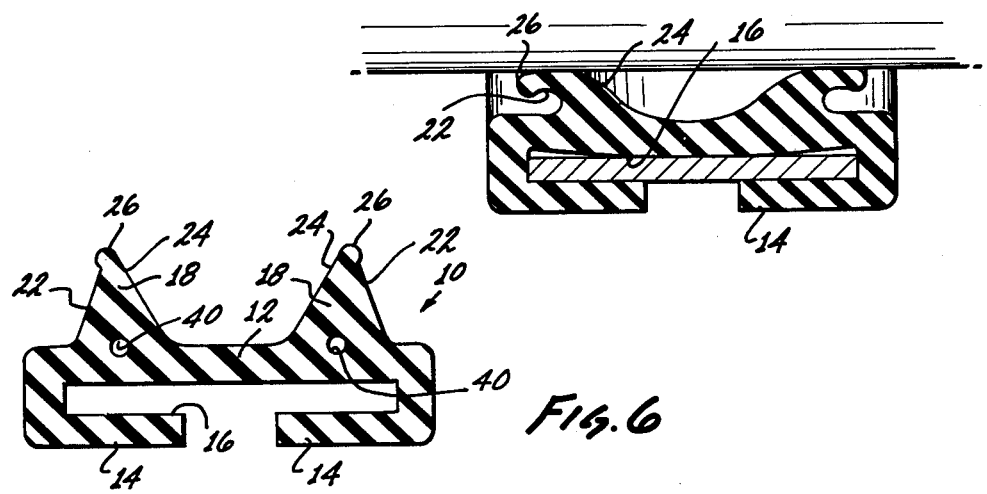
FIG. 6 is a sectional view of a second embodiment of the invention.

The embodiment shown in FIG. 6 may be similar to that shown in the previous figures except that a hole 40 may be provided near the base of each pyramid defined by one of the projections 18. The hole 40 may have a relatively small diameter. The hole may be provided to facilitate the controlled bending of each projection 18 in a direction away from the other projection when cables of different cross-sectional area are disposed on the projections. The hole 40 also facilitates damping of any vibrational movements of the cables disposed on the projections.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A cushion for clamping cables of different cross-sectional area, including,
   a body portion defined by a pair of opposite ends,
   a pair of projections extending from one side of the body portion in spaced relationship to each other and provided with a solid construction, the projections being disposed in inwardly spaced relationship from the ends of the body portion to provide for a support by the ends of the body portion and a controlled bending of the projections when the cable is clamped between the projections, the projections being made from a resilient material to act as resilient springs in response to the force exerted by the cable and shaped to bend only in directions away from each other in accordance with the cross-sectional area of the cables exerting forces on the projections,
   a pair of lips extending from the body portion and toward each other in spaced relationship to the body portion,
   the projections being disposed on the body portion and being shaped to control the bending of the projections by the cables disposed in the space between the projections and no ridges being disposed on the body portion between the projections,
   each of the projections being provided with outboard and inboard sides in substantially a pyramidal shape and extending at a shallower angle from the body portion at the inboard side of the projections than at the outboard side of the projections, and
   a bore having relatively small dimensions provided near the base of the pyramid defined by each projection to facilitate the controlled outward bending of each projection and the damping of vibrations by the cables.

2. A cushion as set forth in claim 1 wherein
   the width of the projections at a position adjacent the body portion is approximately equal to the height of the projections and the inboard side of the projections extends from the base of the projections in a direction toward the outboard side of the projections and the outboard side of the projections extends from the base of the projections in a direction toward the inboard side of the projections,
   the angle between the body portions and the outboard side of the projections being chosen to control the stiffness of the resilient springs defined by the projections.

3. A cushion for use with a clamp to clamp cables of different cross-sectional area, including
   a body portion defined by a pair of opposite ends,
   a pair of lip portions extending from the body portion in spaced and integral relationship to the body portion to define a pocket for receiving the clamp, the lip portions having portions extending toward each other to retain the clamp within the pocket,
   a pair of projections each disposed in inwardly spaced relationship from the adjacent end of the body portion and in integral relationship to the body portion on the opposite side of the body portion from the lip portions to receive the cables of different cross-sectional area and to provide for a support by the ends of the body portion and a controlled bending of the projections when the cable is clamped between the projections and each projection being separated from the other along the body portion in the direction between the ends of the body portion, and without any ridges on the body portion in their distance of separation along the body portion, to receive the cables of different cross-sectional area and each shaped to be bent only outwardly toward the adjacent one of the opposite ends on a controlled basis by the cable, each of the projections being provided with outboard and inboard sides in a pyramidal shape and the outboard side of each projection being steeper than the inboard side relative to the body portion and the outboard side extending toward the inboard side with progressive distances from the body portion and the inboard side extending toward the outboard side with progressive distances from the body portion to define a spring bendable only outwardly by the cables in accordance with the cross-sectional area of the cables, the width of each projection being approximately equal to the height of each projection, and a hole having small dimensions being provided near the base of the pyramid defined by each projection to facilitate the controlled outward bending of each projection and the damping of vibrations by the cables.

* * * * *